United States Patent [19]

Wolfseder

[11] Patent Number: 4,522,256
[45] Date of Patent: Jun. 11, 1985

[54] APPARATUS FOR THE EXTRACTION OF VAPOR FROM A MASH AND/OR WORT TUB

[75] Inventor: Alfons Wolfseder, Freising, Fed. Rep. of Germany

[73] Assignee: Anton Steinecker Maschinenfabrik GmbH, Freising, Fed. Rep. of Germany

[21] Appl. No.: 468,128

[22] Filed: Feb. 22, 1983

[30] Foreign Application Priority Data

Apr. 16, 1982 [DE] Fed. Rep. of Germany ....... 3214064

[51] Int. Cl.³ ............................................. F28F 13/06
[52] U.S. Cl. ..................................... 165/103; 165/111
[58] Field of Search ................ 165/103, 102, 110, 111

[56] References Cited

U.S. PATENT DOCUMENTS

| 42,049 | 3/1864 | Martin | 165/102 |
|---|---|---|---|
| 57,778 | 9/1866 | Senniksen | 165/103 |
| 254,060 | 2/1882 | Sires | 165/102 |
| 289,045 | 11/1883 | Weamer et al. | 165/102 |
| 1,025,736 | 5/1912 | Brewster | 165/102 |
| 3,991,821 | 11/1976 | Cook et al. | 165/103 |
| 4,173,996 | 11/1979 | Pierce | 165/111 X |

*Primary Examiner*—Sheldon J. Richter
*Attorney, Agent, or Firm*—Learman & McCulloch

[57] ABSTRACT

Apparatus for the extraction of vapor from a brewing tub enables the vapor to be guided selectively under the control of a valve either via a tub vapor condenser or a vapor vent pipe arranged as a bypass to the tub vapor condenser. A particularly space-saving construction which enables retrofitting an existing plant comprises a helical tube condenser arranged around the vapor vent pipe having the control valve in the region of its lower end.

13 Claims, 2 Drawing Figures

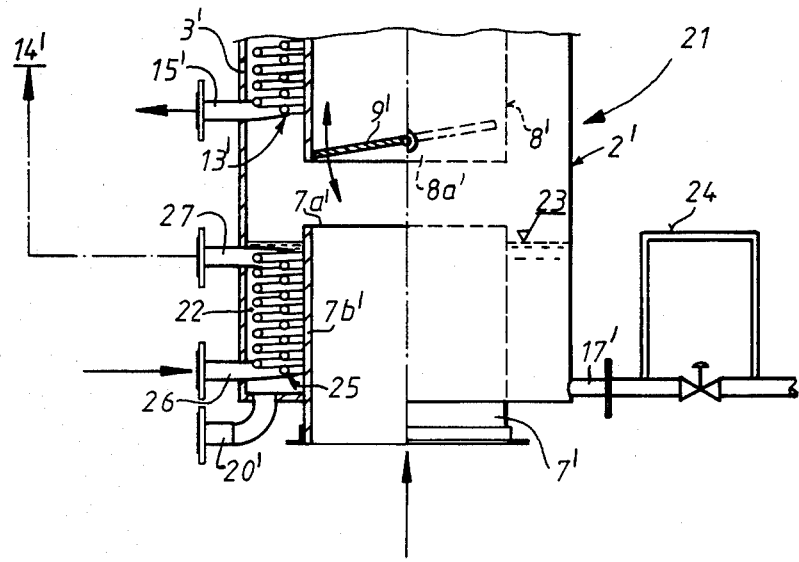

APPARATUS FOR THE EXTRACTION OF VAPOR FROM A MASH AND/OR WORT TUB

BACKGROUND OF THE INVENTION

The invention relates to apparatus for the extraction of vapour from a mash and/or wort tub in which the vapour is guided under the control of a valve via a tub vapour condenser or a vapour vent pipe arranged as a bypass to the tub vapour condenser.

Apparatus of this type with alternative guiding of the vapour makes it possible in those instances in which part of the heat energy of the vapour is to be recovered in a condenser by heating water, as well as in those instances in which the heat recovery to be dispensed with (for instance when the temperature of the vapour is not sufficient for heating water or when no hot water is needed for operational reasons).

In known constructions of this type a tub vapour condenser is arranged at the side of a vapour vent pipe and the vapour is guided as a rule under the control of two valves (one in the vapour vent pipe and one in the pipe leading to the tub vapour condenser). A particular disadvantage of this known construction is that it requires a large amount of space. In many cases this precludes the possibility of equipping existing plant with such an alternative vapour guiding arrangement at a later stage.

SUMMARY OF THE INVENTION

An object of the invention is to avoid the disadvantages of known apparatus and to provide apparatus distinguished by a particularly simple construction requiring little space, thereby enabling it to be installed at a later stage without difficulty in existing plant.

This object is achieved according to the invention by the following features:

(a) The tub vapour condenser is constructed as a helical tube condenser and is arranged coaxially around the vapour vent pipe;

(b) a valve is provided in the region of the lower end of the vapour vent pipe.

If the tub vapour condenser is arranged as a helical tube condenser around the vapour vent then an extremely simple vapour guiding arrangement is provided when the condenser is connected to the flow path.

For this purpose at the lower end of the vapour vent pipe the vapour coming from the tub merely has to be guided somewhat outwards into the annular flow chamber surrounding the vapour vent pipe. If then passes through the condenser while maintaining its substantially vertical flow and is then brought together again at the upper end of the central vent pipe forming the bypass to the condenser. The vapour vent pipe thus forms the inner boundary wall of the flow chamber containing the vapour in the region of the condenser. The outer boundary wall of this flow chamber is formed by a tubular housing the diameter of which is only slightly greater than the diameter of the vapour vent pipe. Thus the apparatus according to the invention has the advantage that it requires a particularly small amount of space and has a very simple construction; it therefore can be installed at a later stage, i.e., retrofitted, without difficulty even in existing plant where space is restricted.

In this construction it is necessary to make use of a single valve only, which is arranged in the region of the lower end of the vapour vent pipe. When the valve is closed the vapour passes exclusively through the helical tube condenser. When the valve is open, on the other hand, almost all of the vapour passes through the vapour vent pipe since the helical tube condenser constitutes a much greater flow resistance for the vapour than does the vapour vent pipe. The use of one single valve to control the vapour flow simplifies the construction and thus contributes to a reduction in the cost of construction.

DESCRIPTION OF THE DRAWINGS

Two embodiments of the invention are illustrated in the accompanying drawings, wherein:

FIG. 2 is a fragmentary view similar to FIG. 1, but illustrating a modified embodiment.

DETAILED DESCRIPTION

Figure 1:
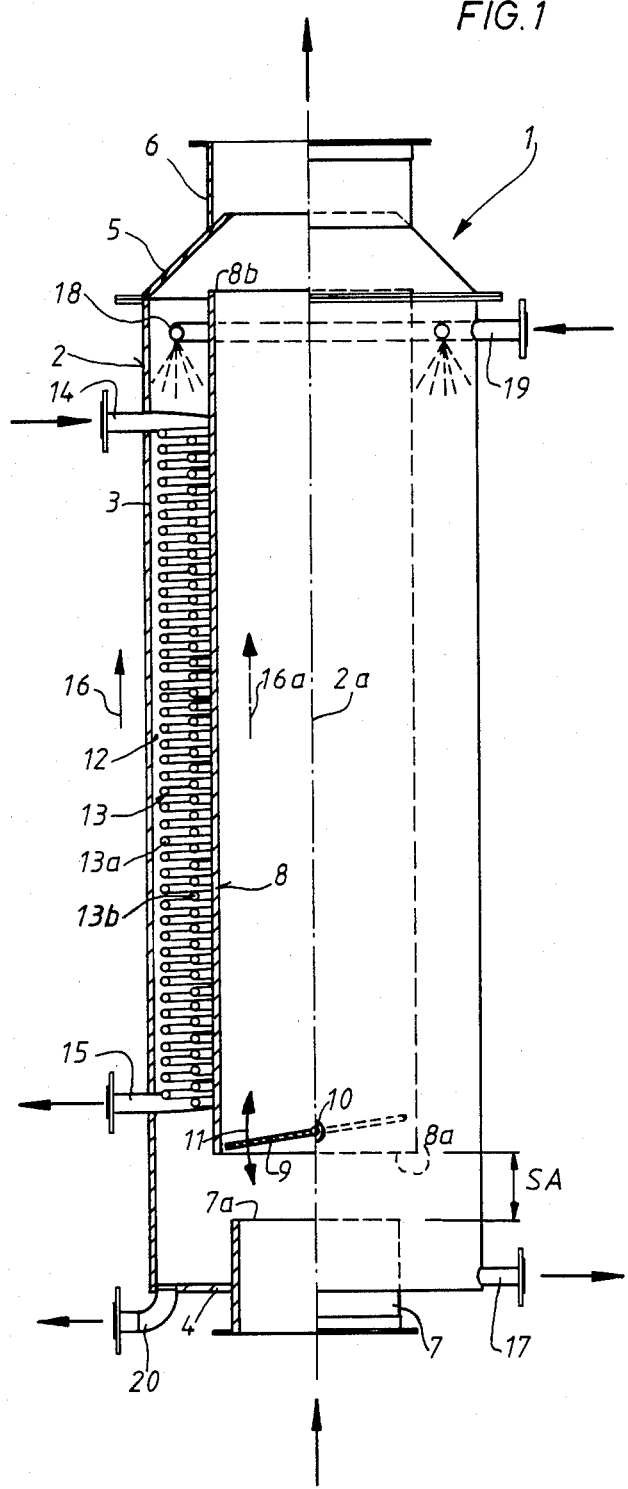
FIG. 1 is a partly elevational, partly sectional, simplified view of a first embodiment of the apparatus.

The apparatus 1 has a tubular outer housing 2 which comprises a substantially cylindrical peripheral wall 3, a (lower) housing base 4, a cover 5 in the form of an inverted truncated cone, and a vapour extraction pipe 6 which is connected approximately at the top of the cover and can be connected or flanged onto an extension pipe which is not shown. At the lower end of the outer housing 2 is a vapour delivery pipe 7 which projects axially through the housing base 4 into the interior of the housing 2. This delivery pipe 7 is preferably of cylindrical construction, arranged coaxially with the peripheral wall 3, and has at its lower end a flange that can be connected to a vapour extraction pipe, not shown, of a mash and/or wort tub.

A vapour vent pipe 8 which is of cylindrical construction and extends over the greater part of the length or height of the cylindrical peripheral housing wall 3 is arranged coaxially (cf. longitudinal axis 2a of the housing) inside the tubular outer housing 2. The lower end 8a of the vapour vent pipe is spaced from the upper end 7a (extending inside the housing) of the vapour delivery pipe 7 by a distance SA. In the region of its lower end 8a the vapour vent pipe 8 has a shut-off valve 9 which can be pivoted about an axis 10 of rotation in the direction of the two-headed arrow 11 in such a way that the lower end 8a of the vapour vent pipe can be opened or closed (naturally intermediate positions are also possible); this movement of the shut-off valve 9 can of course be carried out manually or mechanically.

A substantially cylindrical annular chamber 12 is provided between the peripheral housing wall 3 and the vapour vent pipe 8, the cross-section of the annular chamber being of such a size that a vapour tub condenser constructed as a helical tube condenser 13 can be received and arranged there. This tube condenser 13 is thus arranged coaxially around the vapour vent pipe 8 and in the illustrated embodiment it comprises concentric coils 13a, 13b of the pipe which are arranged coaxially one inside the other. The two coils of pipe are radially spaced relative to each other and to the respective adjacent walls (peripheral wall 3 on the one hand and vapour vent pipe wall on the other hand) and extend over the greater part of the height of the vapour vent pipe 8. Depending upon the structural size and the desired capacity it is of course also possible to construct the tube condenser 13 with only one pipe coil or with more than two pipe coils. In each case, however, a supply 14 of fluid, such as cold water, is provided in the region of the upper end of the apparatus 1 and thus at the upper end of the tube condenser 13, while at the lower end a discharge pipe 15 is provided for the heated water or other fluid.

There are essentially two different ways of operating the apparatus shown in FIG. 1. If it is assumed that the vapour delivered via the delivery pipe 7 is to be led over the tub vapour condenser pipe coil or coils 13, then the shut-off valve 9 is closed as shown in the drawing. Because of the sufficiently large axial distance SA between the adjacent ends of the delivery pipe 7 and the vapour vent pipe 8 the vapour may enter the annular chamber 12 and is there guided upwards in a substantially vertical direction (arrow 16) and thus over the tub vapour condenser coils 13. Since there is also a sufficiently large distance between the upper end 8b and the cover 5 in the upper part of the apparatus 1, the vapour can escape upwards unhindered through the extraction pipe 6. There thus is no need to provide a shut-off valve or the like in the region of the upper end 8b of the vapour vent pipe 8.

If the vapour delivered via the delivery pipe 7 is to be led through the apparatus 1 in the bypass to the tub vapour condenser coils 13, then it is sufficient merely to open the shut-off valve 9 so that the vapour finds its way (because of the lower flow resistance) upwards through the vapour vent pipe 8 (cf. broken arrow 16a). Since the diameter of the vapour delivery pipe 7 is somewhat smaller than that of the vapour vent pipe 8 the bypass arrangement explained immediately above is further favored.

In order for condensate collecting in the lower part of the apparatus or in the base region of the housing 2 to be led off, a condensate discharge pipe 17 which is constructed as a pipe connection and can optionally be equipped with a shut-off valve (not shown) is provided in the region of the housing base 4.

For effective heat exchange between the vapour and the cold water flowing in the tub vapour condenser coils 13 it is also particularly advantageous if the condenser, and in particularly the pipe coils 13a and 13b thereof, can be cleaned from time to time. For this purpose an annular spray line 18 for cleaning fluid may be provided in the annular chamber 12 between the vapour vent pipe 8 and the peripheral housing wall 3 above the condenser 13. This spray line can have an outer delivery connection 19 and can be operated periodically. In this case a discharge connection 20 through which used cleaning fluid can be led off is provided in the housing base 4. This discharge connection 20 can be normally closed (when the cleaning arrangement is out of operation) by a conventional valve (not shown) in the region of the housing base 4 so that no condensate flows off through the connection 20.

In the embodiment of FIG. 2 the upper part of the apparatus 21 can be constructed in the same manner as the embodiment to FIG. 1. For the sake of simplicity parts of the apparatus in FIG. 2 which essentially correspond to those of FIG 1 are provided with the same reference numerals modified by prime so that a detailed description thereof is superfluous.

Thus, in the embodiment of FIG. 2 the tub vapour condenser 13' has helical coils arranged coaxially around the vapour vent pipe 8'. The vapour vent pipe 8' can be opened opened and closed, as explained above, by the valve 9' provided in the region of the lower 8a' of the vapour vent pipe 8'. The inner end 7a' of the vapour delivery pipe 7' which projects from below into the housing 2' terminates at a distance below the lower end 8a' of the vapour vent pipe 8'.

In the embodiment according to FIG. 2 an annular condensate collecting chamber 22 is constructed in the lower part of the housing 2' of the apparatus between the peripheral housing wall 3' and the wall 7b' of the vapour delivery pipe 7' inside the housing. Depending upon the desired size or height of this condensate collecting chamber 22 the wall 7b' of the vapour delivery pipe 7' inside the housing can have a corresponding axial length. The condensate running or dripping from the condenser 13' is to be collected in this condensate collecting chamber 22 up to a level 23 which lies somewhat below the inner end 7a' of the vapour delivery pipe 7'. This level can be adjusted or maintained as desired with the aid of a suitable level regulating arrangement. In the illustrated embodiment a siphon pipe 24 connected to the condensate discharge pipe 17' is provided as level regulating means.

A heat exchanger 25 inside the condensate collecting chamber 22 and, as shown is preferably constructed in the same way as the tube condenser 13', and is arranged around the part 7b' of the vapour delivery pipe 7' inside the housing coaxially therewith. The upper end of the heat exchanger terminates below the condensate level 23, as a consequence of which the heat exchanger 25 is always immersed in fluid condensate. With the aid of the heat exchanger 25 the residual heat still contained in the condensate can be recovered for use, for example, in preheating cold water which is delivered at the lower end of this heat exchanger by a cold water delivery pipe 26. A water discharge pipe 27 is provided at the upper end of the heat exchanger 26.

The heat exchanger 25 also can be used particularly advantageously to preheat the fluid, e.g. cold water, to be delivered to the tube condenser 13'. In this case, as is indicated by a broken line, the water discharge pipe 27 is connected to the delivery pipe to the tube condenser 13' which is not shown in greater detail in the drawing and is only represented by the reference numeral 14'.

In contrast to the first embodiment in which the diameter of the vapour delivery pipe 7 is smaller than that of the vapour vent pipe 8, the vapour delivery pipe 7', as shown in FIG. 2, can have the same diameter as the vapour vent pipe 8' so that the same installation conditions (in the corresponding annular chambers) are provided for the tube condenser 13' and the heat exchanger 25.

The FIG. 2 embodiment of the vapour extraction apparatus may be used most advantageously where vapour delivered via the pipe 7' still has a relatively high heat content.

What is claimed is:

1. Apparatus for extracting vapor from a mash or wort tub having a vapor delivery pipe through which said vapor flows, said apparatus comprising an upright housing closed at its bottom by a wall through which said delivery pipe extends, said housing having an external side wall encircling a vapor vent pipe having its lower end in spaced, substantially axial alignment with said vapor delivery pipe, said vent pipe being spaced from said side wall to form with said bottom wall a condensing chamber between said side wall and said vent pipe; helical tube condenser means accommodated in said condensing chamber; valve means mounted adjacent the lower end of said vent pipe for selectively directing vapor issuing from said delivery pipe to said chamber, or to said vent pipe, or to both; and means at the bottom of said chamber for draining condensate therefrom.

2. Apparatus according to claim 1 wherein said chamber is annular and wherein said condenser means encircles said vent pipe.

3. Apparatus according to claim 1 wherein said vent pipe has a cross-sectional area greater than that of said delivery pipe.

4. Apparatus according to claim 1 wherein said vent pipe has a cross-sectional area corresponding substantially to that of said delivery pipe.

5. Apparatus according to claim 1 including means connected to said condenser means at its upper end for introducing a cooling medium thereto, and means connected to said condenser means at its lower end for draining said cooling medium.

6. Apparatus according to claim 1 including heat exchange means in said housing at its lower end and encircling said delivery pipe.

7. Apparatus according to claim 1 including a discharge line accommodated in said chamber at its upper end for discharging cleaning fluid into said chamber.

8. Apparatus according to claim 7 including outlet means in communication with said chamber at said bottom wall for discharging spent cleaning fluid from said chamber.

9. Apparatus according to claim 1 including means for regulating the level of condensate present in said condensing chamber.

10. Apparatus according to claim 9 wherein said regulating means comprises a siphon pipe.

11. Apparatus according to claim 1 including heat exchange means accommodated in said condensing chamber at its lower end.

12. Apparatus according to claim 11 wherein said heat exchange means comprises a helical coil.

13. Apparatus according to claim 11 including means for delivering a cooling medium to said heat exchange means at its lower end and means at its upper end for delivering cooling medium therefrom to said condenser means.

* * * * *